Sept. 1, 1953     A. BRANDT     2,650,434
GAUGE
Filed Nov. 6, 1951

INVENTOR
Adrianus Brandt
By
Agent

Patented Sept. 1, 1953

2,650,434

UNITED STATES PATENT OFFICE 2,650,434

GAUGE

Adrianus Brandt, Eindhoven, Netherlands, assignor to Hartford National Bank and Trust Company, Hartford, Conn., as trustee Application November 6, 1951, Serial No. 255,018
In the Netherlands March 10, 1951

6 Claims. (Cl. 33—168)

This application is a continuation in part of copending application Serial Number 155,757, filed April 13, 1950.

Gauges comprising a U-shaped housing, two measuring beams fitted in this housing and a measuring block between these beams are known. It is evident that a gauge thus constructed is difficult to manufacture, since not only the measuring beams and the measuring block should have two flat and parallel surfaces, but also the inner surfaces of the housing should be flat and extend parallel to each other.

The present invention has for its object to provide a gauge constructed in the aforesaid manner but without the said disadvantages. According to the invention the gauge is characterized in that it comprises two push members, each of which is located between the side of a measuring beam remote from the measuring block and the housing. Each push member comprises two projections in contact with the aforementioned side of the measuring beam. The assembly of measuring beams, measuring block and push members is secured in the housing by means of a screw acting on at least one push member and fitted in the housing. By this construction it is possible that the surfaces of each measuring beam need not be exactly parallel to each other and that the two inner surfaces of the housing need not exactly be parallel to each other.

In one embodiment of the invention, the assembly of measuring beams, measuring piece and push members is preferably secured by means of a single screw engaging one of the push members, the surface of the other push member facing the housing being such that the push member touches the housing only along a line parallel to the longitudinal direction of the push member. This expedient is also contributive to a simple manufacture of the gauge, since in this construction the inner surfaces of the housing need not exactly extend parallel to each other in a transverse direction.

In a further embodiment of the invention, the push member engaged by the screw is slightly resilient and, in a way, secures the screw in position.

In a further embodiment of the invention, a plate spring is provided between the housing and the push member engaged by the screw. In this manner, the mounting and dismounting of the gauge is simplified since, when the screw is not tightened, there is no risk of component parts of the gauge dropping out of the housing and becoming damaged. To this end, according to a further embodiment of the invention, one projection of the push member not engaged by a screw may be made longer than the other projection, and the surface of the measuring beam cooperating with this push member may be furnished with a recess wherein the longer projection of the push member rests.

In a further embodiment of the invention, the gauge is advantageously constructed in such a manner that the intermediate piece is trapezoidal and has three mutually perpendicular sides and a fourth converging side which engages one of the measuring beams, the side opposite the converging side being much longer than one of the two other sides and the longer of these two other sides being located nearest the measuring side of the gauge.

In order that the invention may be more clearly understood and readily carried into effect, it will now be described more fully with reference to the accompanying drawing, given by way of example, in which.

Figure 1:
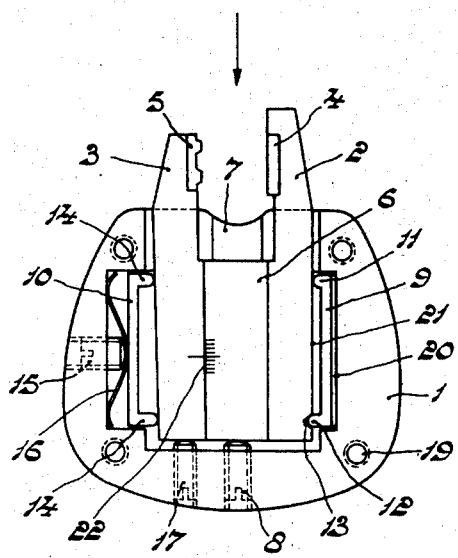
Fig. 1 shows the gauge without cover.
Figure 2:
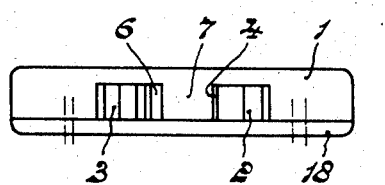
Fig. 2 is a plan view of Fig. 1 taken in the direction of the arrow, in which the cover is present.

The reference numeral 1 denotes a U-shaped housing, in which two measuring beams 2 and 3 are fitted. These measuring beams are each furnished at one end with a measuring surface 4, 5 respectively, consisting of hard metal. Fitted between the measuring beams 2 and 3 is a trapezoidal measuring piece 6, three sides of which are mutually perpendicular, whereas the fourth side slightly converges with regard to the opposite side. The slope of the converging side with regard to the opposite side may, for example, be 1:500 to 1:1000. The measuring piece 6 engages at one end an abutment stop 7 forming part of the housing and at the other end a screw 8 fitted in the housing. Furthermore, the gauge comprises two push members 9 and 10. The push member 9, which is located between the measuring beam 2 and an inner surface of the housing 1, is provided with two projections 11 and 12, the latter being slightly longer than the former and resting in a recess 13 provided in the measuring beam 2. The other push member 10 also has two projections 14 of equal length. The ends of all four projections are rounded in the drawing; however, they may also be knife-edge-shaped. It is in general advantageous that the contact surface between projections and measuring beam is as small as possible.

In one side of the housing a screw 15 is provided by which the push member 10 is pressed against the measuring beam 3, a plate spring 16 being provided between screw 15 and measuring beam 10. The push member 10 is slightly engaged by this plate spring so long as screw 15 has not been tightened or when this screw is loosened to readjust the gauge. Without the plate spring 16 there might be a risk of the measuring beam 3 dropping out of the housing. For the same reason the recess 13 accommodating the projection 12 is provided in the measuring beam 2. Moreover, plate spring 16 provides that on tightening the screw 15 the rational movement of the screw does not affect the adjustment. The position of the measuring beam 3 in the housing is determined by a screw 17, the inner workings being shut off, after mounting, by a lid 18 secured to the housing by means of four screws 19.

Figure 3:
Fig. 3 is a cross-section of a push member.

Fig. 3 is a cross-section at right angles to the direction of length of push member 9. From this figure it is seen that the side of the push member engaging the housing is rounded so that push member and housing engage each other only along a line parallel to the longitudinal direction of the push member. This construction affords the advantage that the inner surface of the housing need not be finished accurately. If, in fact, the surfaces 20 and 21 are not exactly parallel, then if the lower side of push member 9 were surface ground, the assembly consisting of measuring beam 3, measuring piece 6 and measuring beam 2 could be forced outwards against the lid 18 on tightening screw 15. Owing to the push member 9 being rounded, as shown in Fig. 3, the latter is able to adjust itself slightly relative to the measuring beam 2 and the surface 20. Furthermore, it is advisable that the body of push member 10 should be slightly resilient.

The gauge is adjustable to measure in a simple manner by loosening screws 15 and 17 and by shifting the position of beam 3 relative to the trapezoidal measuring piece 6, a vernier 22 rendering excellent services. Owing to the small slope of the converging side of the trapezoidal measuring piece 6 with regard to the other side, a comparatively large displacement of measuring beam 3 corresponds to a very small enlargement or reduction of the measure to which the gauge is adjusted.

It is not necessary for the measuring piece to be trapezoidal, since it may alternatively consist of a so-called standard measuring block having parallel contact surfaces. In this event, the readjustability of the gauge only consists in that the measuring piece is interchangeable.

What I claim is:

1. A gauge comprising a U-shaped housing, two measuring beams fitted in said housing, a measuring block located in said housing between said two beams, two push members, said push members each being located between the side of each measuring beam remote from the measuring block and a wall of a leg of the housing, each of said push members having two projections thereon both of which are in contact with the aforementioned side of the measuring beam, and a screw fitted in the housing and acting against one of said push members for securing the assembly of measuring beams, measuring block and push members in said housing.

2. A gauge comprising a U-shaped housing, two measuring beams fitted in said housing, a measuring block located in said housing between said two beams, two push members, said push members each being located between the side of each measuring beam remote from the measuring block and a wall of a leg of the housing, each of said push members having two projections thereon both of which are in contact with the aforementioned side of the measuring beam, and a screw fitted in the housing and acting against one of said push members for securing the assembly of measuring beams, measuring block and push members in said housing, the side of the other push member which is adjacent a wall of one leg of said housing having a surface which touches along a line parallel to the longitudinal direction of this push member.

3. A gauge comprising a U-shaped housing, two measuring beams fitted in said housing, a measuring block located in said housing between said two beams, two push members, said push members each being located between the side of each measuring beam remote from the measuring block and a wall of a leg of the housing, each of said push members having two projections thereon both of which are in contact with the aforementioned side of the measuring beam, and a screw fitted in the housing and acting against one of said push members for securing the assembly of measuring beams, measuring block and push members in said housing, said push member acted upon being slightly resilient.

4. A gauge comprising a U-shaped housing, two measuring beams fitted in said housing, a measuring block located in said housing between said two beams, two push members, said push members each being located between the side of each measuring beam remote from the measuring block and a wall of a leg of the housing, each of said push members having two projections thereon both of which are in contact with the aforementioned side of the measuring beam, a screw fitted in the housing and acting against one of said push members for securing the assembly of measuring beams, measuring block and push members in said housing, said push member acted upon being slightly resilient, and a plate spring located between a wall of one leg of the housing and the resilient push member.

5. A gauge comprising a U-shaped housing, two measuring beams fitted in said housing, a measuring block located in said housing between said two beams, two push members, said push members each being located between the side of each measuring beam remote from the measuring block and a wall of a leg of the housing, each of said push members having two projections thereon both of which are in contact with the aforementioned side of the measuring beam, a screw fitted in the housing and acting against one of said push members for securing the assembly of measuring beams, measuring block and push members in said housing, the side of the other push member which is adjacent to a wall of one leg of said housing having a surface which touches the housing along a line parallel to the longitudinal direction of this push member, one of the projections of this latter push member having a greater length than the other projection of this push member, this longer projection resting in a recess provided in the surface of the measuring beam cooperating with this push member.

6. A gauge comprising a U-shaped housing, two measuring beams fitted in said housing, a measuring block located in said housing between said two beams, two push members, said push members each being located between the side of each measuring beam remote from the measuring block and a wall of a leg of the housing, each of said push members having two projections thereon both of which are in contact with the aforementioned side of the measuring beam, and a screw fitted in the housing and acting against one of said push members for securing the assembly of measuring beams, measuring block and push members in said housing, said measuring measuring block being trapezoidal in shape and provided with one converging side abutting one of said measuring beams.

ADRIANUS BRANDT.

No references cited.